Patented July 25, 1939

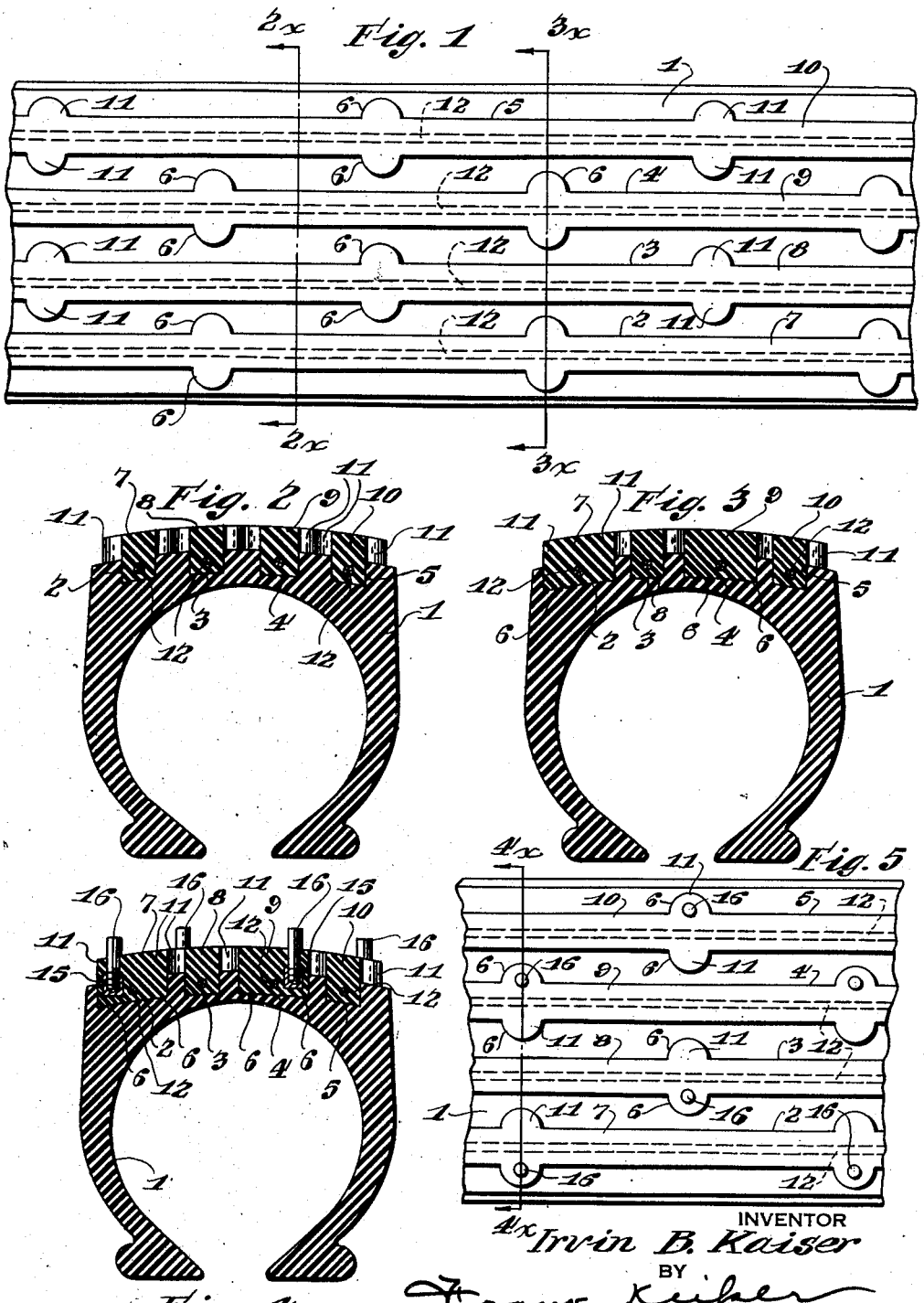

2,167,277

UNITED STATES PATENT OFFICE 2,167,277

AUTOMOBILE TIRE

Irvin B. Kaiser, Lyons, N. Y.

Application June 16, 1936, Serial No. 85,535

2 Claims. (Cl. 152—176)

The object of this invention is to provide a new and improved tire tread in which the ribs are made of removable rings which, as they wear down, can be removed and replaced with new rings.

Another object of the invention is to provide the surface of the tire with a rubber body, in which are formed a series of parallel annular grooves adapted to receive the rings.

Another object of the invention is to reinforce each of the removable rings with a wire cable that will keep them from stretching and better hold them in place.

These and other objects of the invention will be illustrated in the drawing, described in the specification, and pointed out in the claims at the end thereof.

In the drawing:

Figure 1 is a top plan view of the tire, showing four ribs, each of which is a removable ring.

Figure 2 is a section through the tire on the line $2x$—$2x$ of Figure 1.

Figure 3 is a section through the tire on the line $3x$—$3x$ of Figure 1.

Figure 4 is a section through the tire similar to Figure 3, but modified by the insertion of metal studs to make the tire antiskid, the section line being shown at $4x$—$4x$ of Figure 5.

Figure 5 is a top plan view of a portion of the tire provided with the studs shown in Figure 4.

In the drawing like reference numerals indicate like parts.

In the drawing reference numeral 1 indicates the body of the tire, which in this case is covered with rubber in the usual manner and is formed with four annular grooves 2, 3, 4, and 5. These grooves are enlarged with semicircular recesses 6, 6, at the sides thereof, as shown in Figure 1.

In these grooves are placed rings of rubber which extend completely around the tire, these rings being indicated by the numerals 7, 8, 9 and 10. At regular intervals on these rings are formed semicylindrical projections 11, 11, these being arranged in pairs opposite to each other. The body of the tire has corresponding recesses formed on each side of each of the grooves to receive these projections on the rings.

In each ring there is a reinforce or wire cable, as indicated at 12, 12, which keeps the rings from stretching.

The tire is deflated and these rings are put in place in the grooves in the tire, and the tire is then inflated and the rings sink into the grooves and take firm hold therein, and thereby form ribs on the tire. When these ribs wear down, the tire can be deflated and the rings can be removed and new rings can be put in place thereon.

In Figure 4 I have shown metal sockets 15 formed in the rings, preferably in the semicylindrical extension so that they will be out of the way of the wire cables 12, 12. These metal sockets are threaded with a female thread, and when it is desired to make the tire antiskid, studs 16, 16 can be inserted in these sockets. These studs will appear as shown in top plan view in Figure 5.

If the tire is punctured and goes flat the rings will have the same tendency to remain on the tire that the tire has to remain on the rim of the wheel. In fact, it is believed that the rings will adhere to the tire, or stay in place thereon, even more firmly than the tire will remain on the rim, for the reason that the rings are reenforced and this would tend or help to restrain them from jumping out of the grooves.

It is obvious that the rubber rings may be omitted and the tire with the annular grooves and semi-cylindrical extensions on the sides of the grooves may be used without the rings. This is important because in the event that the rings wear down to the surface of the tire, the rings can be removed and the tire with its empty grooves can be used and forms in itself a new type of non-skid tire.

I claim:

1. A pneumatic tire having a body portion with a plurality of annular grooves therein, a rubber ring placed in each of said grooves and extending above the periphery of the tire, each of said rings having semicylindrical extensions on the sides thereof extending from the top to the bottom of the ring, corresponding recesses in the body of the tire in which said extensions engage each of the grooves having a rectangular cross section and each of the rings having a rectangular cross section that fits the grooves, said grooves and rings running continuously around the tire.

2. A pneumatic tire having a body portion with a plurality of annular grooves therein, each of said grooves having a rectangular cross section, each of said grooves having semi-cylindrical recesses or extensions on the sides thereof, each of said grooves being adapted to receive a ring having a cross section that fits the groove, said tire being capable of use without the rings.

IRVIN B. KAISER.